United States Patent [19]

Neukam et al.

[11] 4,076,925

[45] Feb. 28, 1978

[54] STABILIZING CROSSLINKABLE COPOLYMERS COMPRISING ACRYLONITRILE, N-METHYLOL ALKYL ETHER OF UNSATURATED CARBOXYLIC ACID AMIDE WITH (A) AMIDE (B) LACTAM OR (C) UREA COMPOUNDS

[75] Inventors: Theo Neukam; Ulrich Reinehr, both of Dormagen; Francis Bentz, Cologne; Günther Nischk, Dormagen, all of Germany

[73] Assignee: Bayer Aktiengesellschaft, Leverkusen-Bayerwerk, Germany

[21] Appl. No.: 751,364

[22] Filed: Dec. 16, 1976

[30] Foreign Application Priority Data

Dec. 19, 1975 Germany ............................ 2557502

[51] Int. Cl.[2] ........................... C08F 2/00; C08F 2/16; C08F 20/70

[52] U.S. Cl. ........................... 526/204; 260/32.6 NA; 260/45.9 NC; 526/220; 526/304

[58] Field of Search ................ 526/204, 220, 264, 304

[56] References Cited

U.S. PATENT DOCUMENTS

| | | | |
|---|---|---|---|
| 3,326,868 | 6/1967 | Tucker | 526/304 |
| 3,399,177 | 8/1968 | Reeder et al. | 526/304 |
| 3,445,403 | 5/1969 | Tucker et al. | 526/304 |
| 3,503,918 | 3/1970 | Le Sota et al. | 526/304 |
| 3,551,525 | 12/1970 | Heinsheim et al. | 526/264 |
| 3,574,177 | 4/1971 | Nakajima et al. | 526/204 |
| 3,577,376 | 5/1971 | Lanthier et al. | 526/220 |
| 3,708,444 | 1/1973 | Ganzler et al. | 526/220 |
| 3,864,323 | 2/1975 | Stoy | 526/220 |
| 3,876,577 | 4/1975 | Hornig et al. | 526/304 |
| 3,925,288 | 12/1975 | Ganslaw et al. | 526/304 |
| 3,925,293 | 12/1975 | Knechtges et al. | 526/304 |

*Primary Examiner*—Herbert J. Lilling

*Attorney, Agent, or Firm*—Plumley and Tyner

[57] ABSTRACT

The invention relates to a process for the production of stabilized, crosslinkable copolymers of acrylonitrile with N-methylol alkyl ethers of unsaturated carboxylic acid amides and optionally other comonomers by polymerizing in the presence of a stabilizer compound containing a carboxylic acid amide group such as amide, urea or lactam.

7 Claims, No Drawings

STABILIZING CROSSLINKABLE COPOLYMERS COMPRISING ACRYLONITRILE, N-METHYLOL ALKYL ETHER OF UNSATURATED CARBOXYLIC ACID AMIDE WITH (A) AMIDE (B) LACTAM OR (C) UREA COMPOUNDS

This invention relates to a process for the production of stabilised, crosslinkable polymers of acrylonitrile, a crosslinking component and, optionally, other comonomers with water-soluble amides and/or ureas and/or lactams. Acrylic or methacrylic acid amides substituted by methylol alkyl ether groups are used as the crosslinking component.

It is already known (E. Muller et al., Markro. Mol. Chem. 57, 27 (1962) that methylol alkyl ethers of acid amides readily crosslink in the presence of acids or acid donors.

It is also known that autocrosslinkable polymers can be stabilised by the addition of an $\alpha$-aminocarboxylic acid during or after polymerisation (German Offenlegungsschrift No. 19 11 360). It is possible by this process to obtain storable emulsions of homopolymers or copolymers of olefinically unsaturated amides containing methylol groups.

In the process described in French Pat. No. 1,500,101, crosslinking during polymerisation is prevented by the addition of mineral salts. The addition of mineral salts also prevents crosslinking during drying.

Stabilisations of the kind in question are necessary because undesirable crosslinking can occur very quickly, even during the polymerisation of acrylonitrile and N-methylol alkyl ethers of (meth)acrylic acid amides, especially when such polymerisation reactions are carried out in an acid medium. Unfortunately, the use of conventional stabilisers involves certain disadvantages, for example, the fact that the polymer obtained after polymerisation has to be treated with a very large quantity of washing agent in order to remove at least most of the salt added.

Accordingly, it is an object of the present invention to avoid the above-mentioned disadvantages.

It is another object to provide a process for the production of stabilised crosslinkable acrylonitrile polymers.

Other objects will be evident from the following description and the Examples.

It has now been found that acrylonitrile can be polymerised with (meth)acrylamide-N-methylol ethers and, optionally, other comonomers smoothly and without any crosslinking occurring, provided that water-soluble amides and/or ureas and/or lactams are added to the reaction mixture before polymerisation.

Accordingly, the invention relates to a process for the production of a stabilised, crosslinkable copolymer of acrylonitrile wherein at least 72% by weight of acrylonitrile is copolymerised with 0.1 to 12% by weight of an N-methylol alkyl ether of an ethylenically $\alpha,\beta$-unsaturated carboxylic acid amide and 0.5 to 4% by weight of at least one other polymerisable comonomer in an aqueous medium and in the presence of a redox catalyst, wherein the polymerisation reaction is carried out in the presence of 2 to 12% by weight, based on the total quantity of monomers of at least one water-soluble stabilizer compound containing a carboxylic acid amide group and wherein the resulting polymer is recovered.

According to the invention, the water-soluble compound containing a carboxylic acid amide group is a carboxylic acid amide corresponding to the general formula:

$$R_1-\overset{O}{\overset{\|}{C}}-N\begin{matrix} R_2 \\ R_3 \end{matrix}$$

in which $R_1$ represents hydrogen, an alkyl radical with up to 6 carbon atoms, an aromatic radical, preferably phenyl, or the group $$-(CH_2)_n-CON\begin{matrix} R_2 \\ R_3 \end{matrix},$$

$n$ being an integer from 1 to 3, and $R_2$ and $R_3$ which may be the same or different, represent hydrogen, or a methyl or ethyl radical, or a urea corresponding to the general formula:

$$\begin{matrix} R_1 \\ R_2 \end{matrix}N-\overset{O}{\overset{\|}{C}}-N\begin{matrix} R_3 \\ R_4 \end{matrix}$$

in which $R_1$ to $R_4$, which may be the same or different, represent hydrogen, or an alkyl radical with up to 3 carbon atoms, or a lactam corresponding to the general formula $$\overbrace{R_1 \quad N-R_2}^{\frown}\ \text{(ring closed through } \underset{O}{\overset{\|}{C}}\text{)}$$

in which $R_1$ is an alkylene radical with 3 to 6 carbon atoms and $R_2$ represents hydrogen or an alkyl radical with 1 to 3 carbon atoms.

In the context of this invention, water-soluble does not mean that the carbonamide compound must be miscible with water in any ratio. However, it should have a solubility in water under the polymerisation conditions of from 2 to 12%, preferably from 5 to 9%.

The (meth)acrylic acid amide-N-methylol alkyl ethers used are compounds corresponding to the general formula:

$$CH_2=\underset{R}{\underset{|}{C}}-(CH_2)_n-C\begin{matrix} {}^{\nearrow O} \\ {}_{\searrow NH-CH_2-OR'} \end{matrix}$$

in which

R represents hydrogen or a methyl group;

$n$ = O or an integer from 1 to 5; and

R' represents a linear or branched-chain aliphatic radical with 1 to 10 carbon atoms.

Examples of alkyl ethers of N-methylol compounds of unsaturated acid amides, which are preferably used in quantities of from 0.1 to 12%, are (meth)acrylamide-N-methylol ethyl ether, (meth)acrylamide-N-methylol-n- propyl ether, (meth)acrylamide-N-methylol-i-propyl ether, but preferably (meth)acrylamide-N-methylol methyl ether. These compounds may readily be synthesized by the methods described in the literate (E. Muller, K. Dinges, W. Graulich, Makro. Mol. Chem. 57, 27 (1962).

Examples of stabilizers, which are more preferably used in quantities of from 5% to 9% by weight, based on the total quantity of monomers, are dimethyl formamide, acetamide, propionic acid amide, butyric acid amide, valeric acid amide, benzamide, malonic acid diamide, succinic acid diamide, glutaric acid diamide, urea, N-methyl urea, N-ethyl urea, N,N'-dipropyl urea, trimethyl urea, N-methyl pyrrolidone and caprolactam. It is preferred to use urea, N-methyl urea, acetamide and caprolactam. Urea and caprolactam are particularly preferred.

The polymerization reaction is carried out in an aqueous medium.

The initiators used are the known redox systems, preferably alkali peroxodisulphate/alkali bisulphite. The quantitative ratio in which the two components of the initiator system are used is from 4:1 to 1:4. The polymerisation reaction is best carried out at a pH-value of from 2 to 4.2 and preferably at a pH-value of from 2.5 to 3.9. The polymerization temperature should preferably be in the range from 30° C to 70° C and more preferably in the range from 50° C to 60° C and the polymerization time in the range from 3 hours to 10 hours, preferably in the range from 5 hours to 7 hours. The polymers are isolated in the usual way by filtration under suction. This is followed by drying for 3 to 10 hours at 30° to 80° C.

The polymers obtained in accordance with the invention may be stored for indefinite periods. They may be processed into shaped articles by conventional methods without any precautionary measures having to be taken. They are preferably dry-spun or wet-spun into cross-linkable filaments by known methods. In this case, dimethyl formamide, dimethyl acetamide and dimethyl sulphoxide are preferably used as solvents for the spinning process.

In the following Examples, which are to further illustrate the invention without limiting it, the parts by volume quoted are to parts by weight as liters are to kilograms.

EXAMPLE 1

82.5 parts by volume of acrylonitrile and 3.5 parts by weight of N-methoxy methyl acrylamide were combined in 900 parts by volume of water and the pH-value was adjusted to 3.5 by the addition of dilute sulphuric acid. 3.5 parts by weight of urea were then added, after which the polymerisation reaction was initiated under nitrogen by the addition of 0.5 part by weight of potassium persulphate and 2.0 parts by weight of sodium bisulphite. After stirring for 6 hours at 55° C, the polymer was filtered off under suction and washed until neutral. It was then dried at 60° C. The yield comprised 60 parts by weight. K-value: 83.5.

EXAMPLE 2

78 parts by volume of acrylonitrile, 7 parts by weight of N-methoxy methyl acrylamide and 7 parts by weight of urea were introduced into 900 parts by volume of water. The pH-value was adjusted to 3.6. The polymerisation reaction was then initiated under nitrogen at 55° C by the addition of 0.5 part by weight of potassium persulphate and 2 parts by weight of sodium bisulphite. The polymerisation time was 5 hours. The polymer was filtered off under suction and washed until neutral. It was dried at 60° C. Yield: 61 parts by weight, K-value: 85.

EXAMPLE 3

82.5 parts by volume of acrylonitrile and 3.5 parts by weight of N-methoxy methyl acrylamide were combined in 900 parts by volume of water. Following the addition of 3.5 parts by weight of N-methyl pyrrolidone, the pH-value was adjusted to pH 3.5 by the addition of dilute sulphuric acid. Polymerisation was carried out under nitrogen at a temperature of 55° C. The polymerisation reaction was initiated by the addition of 0.5 part by weight of potassium persulphate and 2 parts by weight of sodium bisulphite. The polymerisation mixture was stirred for 6 hours at the above-mentioned temperature. The product was worked up as described in the preceding Examples. Yield: 60 parts by weight, K-value: 82.

EXAMPLE 4

78 parts by volume of acrylonitrile, 7 parts by weight of N-methoxy methyl acrylamide and 7 parts by weight of caprolactam were introduced into 900 parts by volume of water. After the pH-value had been adjusted to 3.5, the initiator system in the form of 0.5 part by weight of potassium and 2 parts by weight of sodium bisulphite was added. The polymerisation mixture was stirred under nitrogen for 6 hours at 55° C. The polymer was then worked up in the same way as in the preceding Examples. Yield: 60 parts by weight, K-value: 76.5.

EXAMPLE 5

78 parts by volume of acrylonitrile, 7 parts by weight of N-methoxy methyl acrylamide and 7 parts by weight of dimethyl acetamide were combined in 900 parts by volume of water. The pH-value was adjusted to 3.5 by the addition of dilute sulphuric acid. The polymerisation reaction was initiated by the addition of 0.5 part by weight of potassium persulphate and 2 parts by weight of sodium bisulphite. The polymerisation mixture was stirred under nitrogen for 6 hours at 55° C. The polymer was then filtered off under suction, washed until neutral and dried at 60° C. Yield: 51 parts by weight, K-value: 77.

EXAMPLE 6

78 parts by volume of acrylonitrile and 7 parts by weight of N-methoxy methyl acrylamide were combined in 900 parts by volume of water. Following the addition of 7 parts by weight of dimethyl formamide, the pH-value was adjusted to 3.5. The polymerisation reaction was initiated by the addition of 0.5 part by weight of potassium persulphate and 3.5 parts by weight of sodium bisulphite. After stirring under nitrogen for 5 hours at 55° C, the product was worked up in the same way as in the preceding Examples. Yield: 51 parts by weight, K-value: 83.

EXAMPLE 7

78 parts by volume of acrylonitrile, 6 parts by weight of N-ethoxy methyl acrylamide and 7 parts by weight of dimethyl formamide were combined in 900 parts by volume of water. Following adjustment of the pH-value to 3.5, the polymerisation reaction was initiated by the addition of 0.5 part by weight of potassium persulphate and 2 parts by weight of sodium bisulphite. The reaction temperature was 55° C. After stirring under nitrogen for 6 hours, the polymer was filtered off under suction, washed until neutral and dried at 60° C. Yield: 49 parts by weight, K-value: 84.

By way of comparison, the following test was carried out in the absence of any stabilising additions:

EXAMPLE 8

78 parts by volume of acrylonitrile and 7 parts by weight of N-methoxy methylacrylamide were combined under nitrogen at 55° C in 900 parts by volume of water. The polymerisation reaction was initiated at pH 3.5 by the addition of 0.5 part by weight of potassium persulphate and 2 parts by weight of sodium bisulphite. The polymerisation mixture was stirred for 6 hours. The product was worked up in the same way as in the preceding Examples. Yield: 45 parts by weight, K-value: cannot be determined on account of heavy crosslinking.

What we claim is:

1. A process for the production of a crosslinkable copolymer of acrylonitrile, prepared from 88 parts by weight of a mixture of the following monomers a. at least 72 parts by weight of acrylonitrile, b. 0.1–12 parts by weight of N-methylol alkyl ether of an ethylenically $\alpha,\beta$-unsaturated carboxylic acid amide, and c. 0.5–4 parts by weight of at least one other comonomer;

the process comprising polymerizing said mixture in an acidic aqueous medium in the presence of a redox catalyst and in the presence of 2–12 parts by weight of a water-soluble stabilizer which prevents crosslinking during polymerization and which is selected from the group consisting of a. a carboxylic acid amide of the formula $$R_1-\overset{O}{\overset{\|}{C}}-N\begin{matrix} R_2 \\ R_3 \end{matrix}$$

in which $R_1$ is hydrogen, $C_1$–$C_6$-alkyl, aryl, or $$-(CH_2)_n-CON\begin{matrix} R_2 \\ R_3 \end{matrix},$$

wherein $R_2$ and $R_3$ are hydrogen, methyl, or ethyl; and $n$ is an integer from 1 to 3;

b. a urea of the formula $$\begin{matrix} R_1 \\ R_2 \end{matrix}N-\overset{O}{\overset{\|}{C}}-N\begin{matrix} R_3 \\ R_4 \end{matrix}$$

in which $R_1$ to $R_4$, are hydrogen, $C_1$–$C_3$-alkyl; or c. a lactam of the formula $$\overbrace{R_1 \quad N-R_2}\atop{\underset{\underset{O}{\|}}{C}}$$

in which $R_1$ is $C_3$–$C_6$-alkylene and $R_2$ is hydrogen or $C_1$–$C_3$-alkyl;

and recovering said crosslinkable copolymer.

2. The process of claim 1, wherein said stabilizer is an amide.

3. The process of claim 1, wherein said stabilizer is a lactam.

4. The process of claim 1, wherein said stabilizer is a urea.

5. The process of claim 1, wherein said stabilizer is used in a quantity of from 5 to 9 parts by weight.

6. The process of claim 1, wherein said N-methylol alkyl ether is a methacrylamide- or acrylamide-N-methylol methyl ether.

7. The process of claim 1, wherein polymerization is carried out at a temperature of from 30° C to 70° C.

* * * * *